Dec. 25, 1928.

W. HENRY 1,696,632

POWER TRANSMISSION DEVICE

Filed April 23, 1927  4 Sheets-Sheet 1

Inventor,
William Henry,
by his Attorneys,
Howson & Howson

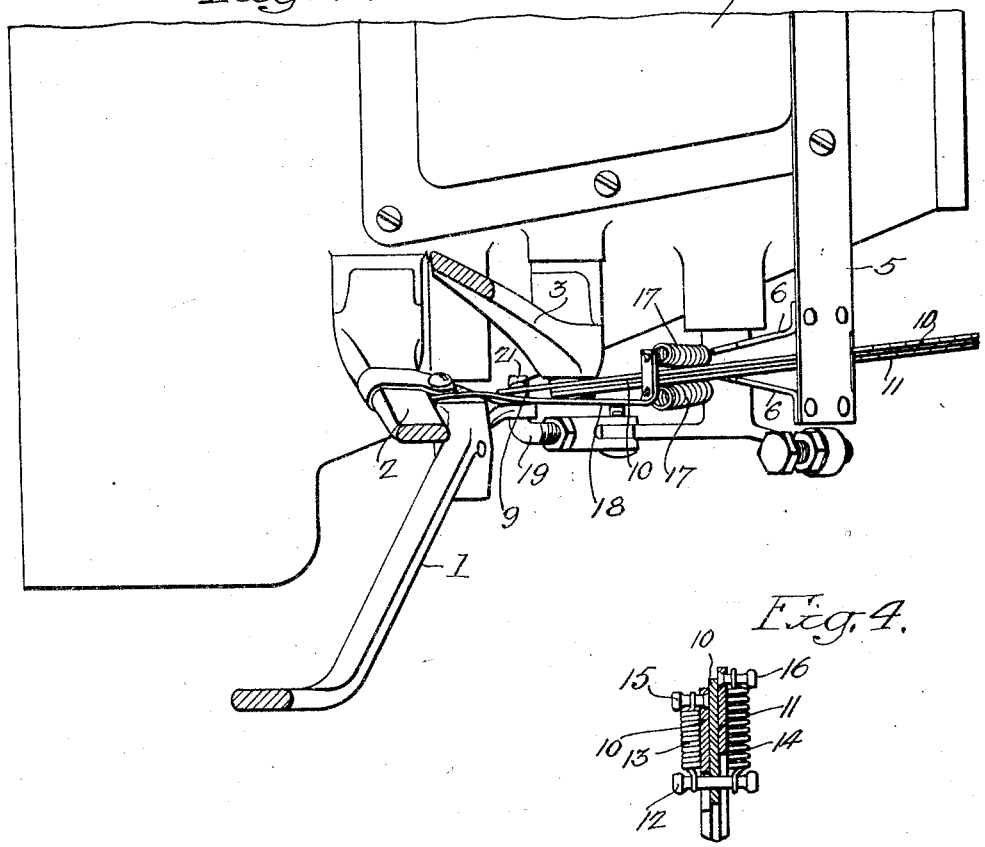
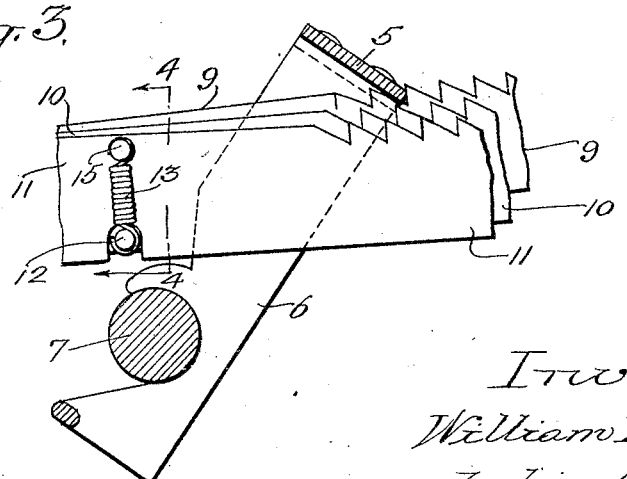

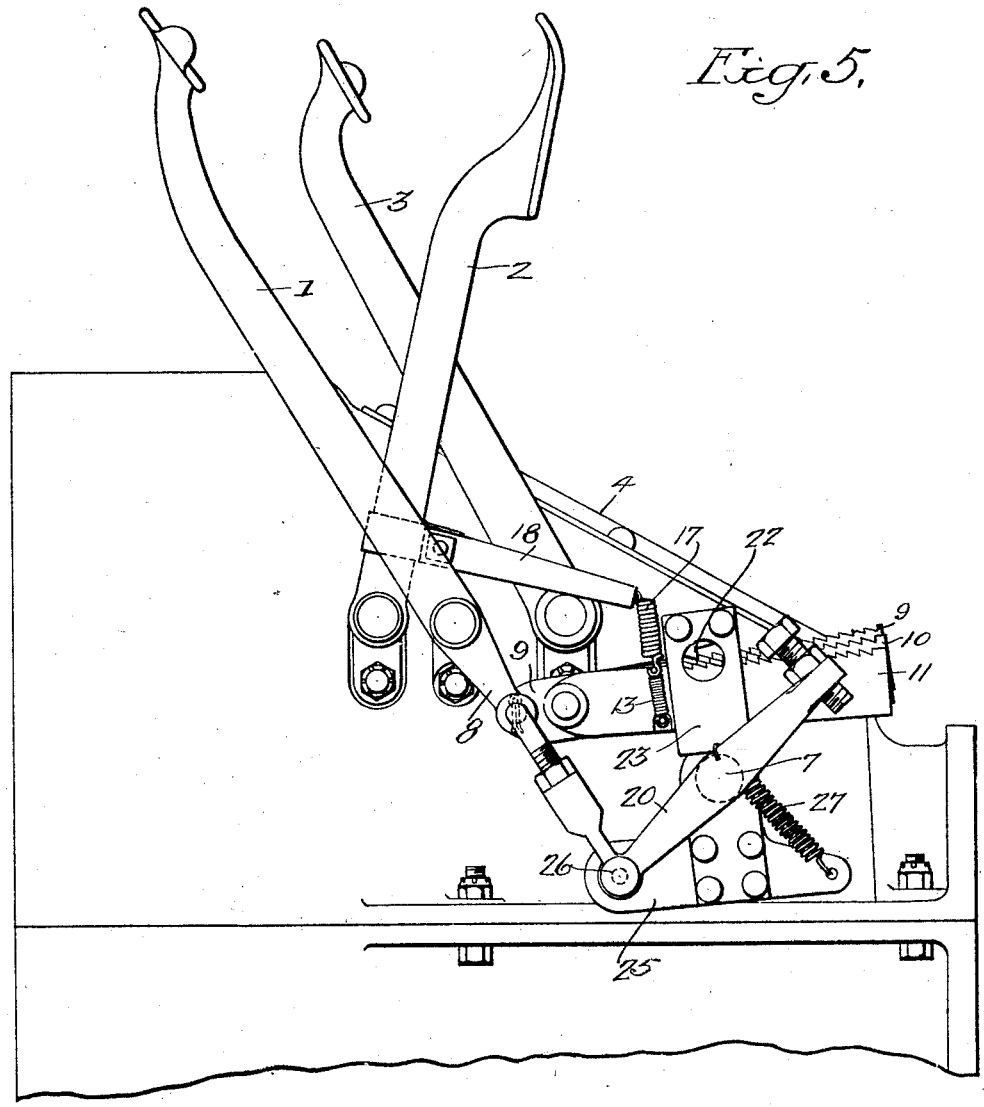

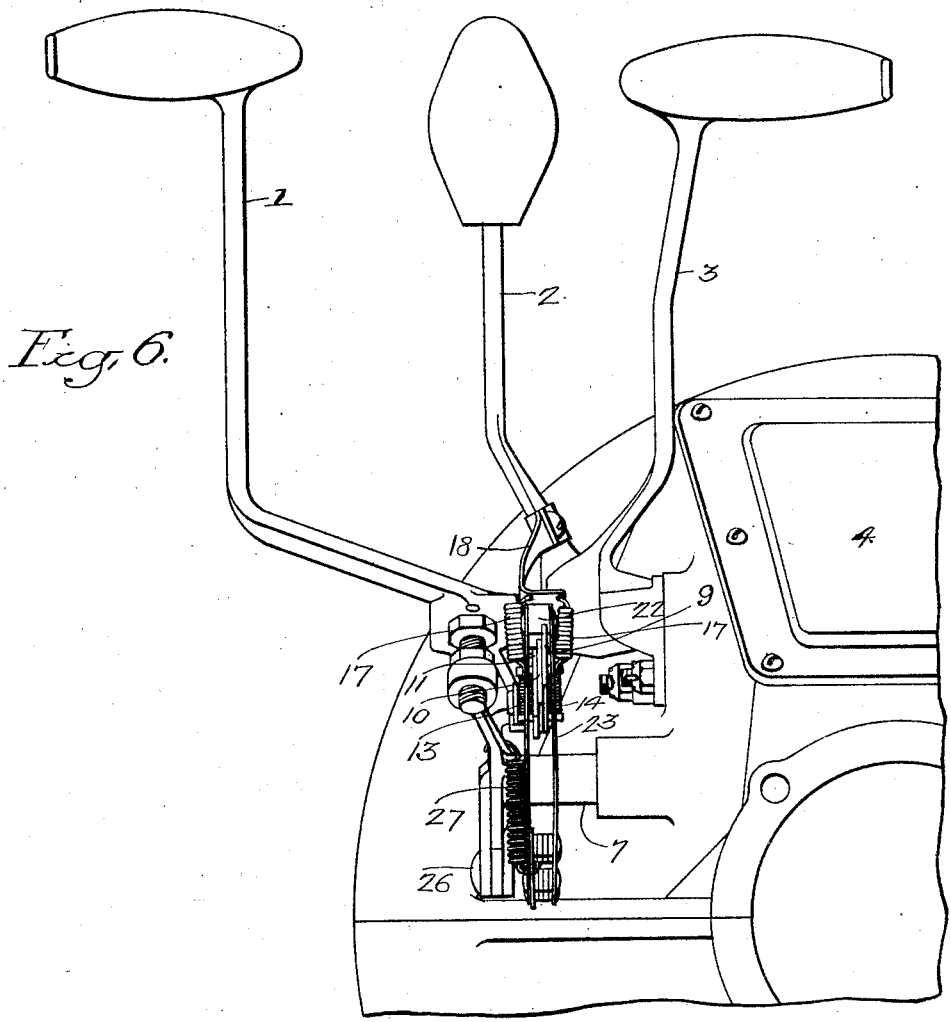

Patented Dec. 25, 1928.

1,696,632

UNITED STATES PATENT OFFICE.

WILLIAM HENRY, OF PHILADELPHIA, PENNSYLVANIA.

POWER-TRANSMISSION DEVICE.

Application filed April 23, 1927. Serial No. 186,052.

The principal object of this invention is to provide improved means for releasably holding the forward transmission pedal of Ford automobiles in the advanced or slow speed position whereby the operator can maintain the low speed without exerting a continuous pressure upon the transmission pedal.

The invention resides primarily in the arrangement of parts and novel details of construction hereinafter set forth and illustrated in the attached drawings, in which:

Fig. 2 is a plan view of the mechanism shown in Fig. 1 with the upper portions of the pedals removed;

Fig. 3 is an enlarged fragmentary elevation showing a detail of the mechanism;

Fig. 4 is a section on the line 4—4, Fig. 3;

Fig. 5 is a side elevational view similar to Fig. 1 but showing a modification within the scope of the invention, and Fig. 6 is a rear elevation of the mechanism shown in Fig. 5.

Figure 1:
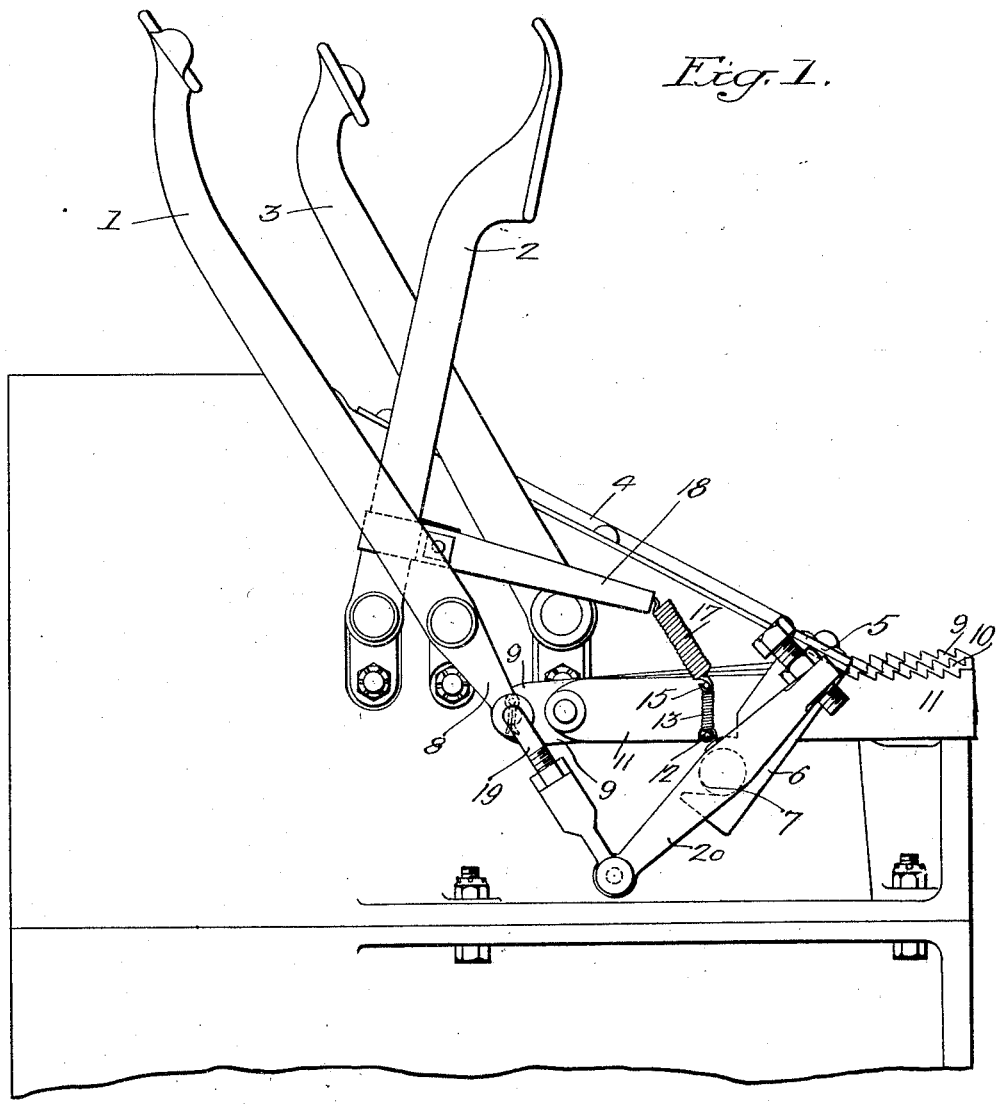
Figure 1 is a side elevation of the control pedals of a Ford automobile equipped with a device made in accordance with my invention.

With reference to the drawings and particularly to Figs. 1 to 4, inclusive, 1 represents the forward transmission pedal of a Ford automobile, 2 the reverse pedal, and 3 the brake pedal. The operation of these pedals is well understood, and it may be kept in mind that when the pedal 1 is in an intermediate position, the transmission is in neutral. When it is elevated, the high speed forward transmission is effected, and when entirely depressed, the low speed forward transmission is applied. Each of the pedals normally is held in an advanced or elevated position by a spring (not shown).

It is often desirable, when it is necessary to keep the automobile in low speed for considerable lengths of time, to release the foot pressure from the pedal 1, and it is the object of the invention to provide readily releasable means for holding the pedal down independent of foot pressure.

Extending transversely from the top of the transmission casing 4 is a bar 5, the outer end of this bar being supported by means of a pair of braces 6 which, as well shown in Fig. 3, bear upon and are supported by the clutch lever shaft 7 of the machine. Secured to the lower projecting end 8 of the lever 1 and extending beneath the bar 5 is a notched lever 9 which has pivotally secured thereto similarly notched levers 10 and 11. As shown in Fig. 4 the lever 10 has a transverse pin 12 therein projecting from both sides which are connected through the medium of springs 13 and 14 with the levers 9 and 11 respectively, pins 15 and 16 being provided on the outer sides of the latter to which the said springs are respectively attached. The levers are normally supported so that their notched upper edge is in contact with the lower edge of the bar 5 by means of a pair of springs 17, 17, which are connected respectively to the pins 15 and 16, and at their upper ends to an arm 18 projecting from the reverse lever 2, as well shown in Fig. 1. The arrangement is such that normally when the reverse lever 2 is in the elevated inoperative position, as shown in Fig. 1, the spring 17 is relaxed and permits the levers 9, 10, and 11 to drop sufficiently to clear the lower edge of the arm 5. It will be noted that the lever 9 is attached to the lower end of the lever 1 through the medium of the link 19 which connects the lever with the clutch lever 20 on the outer end of the shaft 7. The link 19 extends through an opening in the lower end 8 of the lever 1 and through an opening in the end of the lever 9, and the connection is maintained by means of a cotter pin 21.

From the foregoing construction it will be apparent that in the normal operation of the lever 1, the notched levers 9, 10 and 11 will not engage the bar 5. If, however, a slight pressure is placed upon the lever 2 so that it is advanced slightly, the levers 9, 10 and 11 are brought up into engagement with the bar 5, and under these circumstances if the pedal 1 is advanced, it will be held through the medium of the notched levers 9, 10 and 11 in the advanced position. Under these circumstances, the pedal 1 should be released first and thereafter the pedal 2 may be released, and the former pedal will be retained in the low speed position. A forward movement of the pedal 1, however, with the reverse pedal in the normal elevated position will result in a release of the notched edge of the lever 9, 10 or 11 from the bar 5, which permits the levers to drop down, thereby permitting the return movement of the pedal 1 to the neutral or high speed position.

One of the important features of this construction is found in the use of the compound lever 9—10—11. It will be noted that the notches in these levers, see Fig. 3, are staggered, so that as the multiple lever moves rearwardly in contact with the bar 5, the teeth of the lever pass the edge of the bar individually and in succession. This permits the use of relatively large and strong teeth on these levers with exactly the same effect as though a notch three times as small were used on a single gear.

In Figs. 5 and 6, I have illustrated a slight modification in which the notch-engaged bar 22 is carried by a yoke 23 pivotally supported on the clutch lever shaft 7. The yoke or bracket 23 has a transverse extension 25 which is pivotally secured at 26 to the lower end of the clutch lever 20. A spring 27 secured to the extension 25 and to the clutch lever 20 holds these parts in a normal relative position. A triple notched lever 9—10—11 similar to that previously described is secured in the same manner to the lower end 8 of the pedal lever 1 and is connected resiliently and in the manner previously described to the reverse lever 2. In this instance, the operation is in general the same as that previously described, although the construction differs largely in that it avoids the necessity of securing the bar 5 to the casing 4, as in the previously described embodiment. It will be noted, however, that there is in this case an actual movement of the bracket 23 when the pedal 1 is shifted, and this movement being in each instance opposite to the movement of the lever 9—10—11 facilitates the release of the lever from the bracket and makes the release of the pedal 1 from the forward locked position a relatively quick one.

I claim:

1. In a power transmission device, the combination with a pivoted clutch lever adapted normally to be retained resiliently in a retracted position, of a plurality of notched levers pivotally attached to said clutch lever, and a relatively fixed abutment adapted to engage in said notches whereby the clutch lever is retained in an advanced position, the notches in each of said levers being staggered with respect to the notches of the other levers whereby the levers are effective individually to retain the said clutch lever in the advanced position.

2. In a power transmission device, the combination with a pivoted clutch lever, of a relatively fixed abutment, and a plurality of notched levers pivotally connected to the clutch lever and adapted to be successively and repeatedly brought into interlocking engagement with said abutment when the clutch lever is advanced to retain the latter in the advanced positions.

3. In a power transmission device, the combination with a pivoted clutch lever, of a relatively fixed abutment, a plurality of notched levers pivotally connected to the clutch lever and adapted to be successively brought into interlocking engagement with said abutment when the clutch lever is advanced to retain the latter in the advanced position, said notched levers normally occupying a position free of said abutment, and means independently operative for resiliently maintaining an operative connection between the levers and said abutment.

4. In a power transmission device, the combination with a pivoted clutch lever, of a second pivoted control lever, a relatively fixed abutment, a plurality of notched levers pivotally connected to the clutch lever and adapted to be brought into interlocking engagement with said abutment to retain the latter in an advanced position, said levers normally lying out of contact with said abutment, and means operatively connected with said control lever for bringing said notched levers into engagement with said abutment.

5. In a power transmission device, the combination with a pivoted clutch lever, of a relatively fixed abutment, and a plurality of notched levers pivotally connected to the clutch lever and adapted to be brought into interlocking engagement with said abutment when the clutch lever is advanced, the notches in each of said levers being staggered with respect to the notches of the other levers so that the levers interlock separately and successively with said abutment, an independent control lever, and means associated with said lever for retaining the said notched levers in operative relation with said abutment.

WILLIAM HENRY.